(12) United States Patent
Fukuda

(10) Patent No.: US 8,104,008 B2
(45) Date of Patent: Jan. 24, 2012

(54) LAYOUT DESIGN APPARATUS, LAYOUT DESIGN METHOD, AND COMPUTER PRODUCT

(75) Inventor: Daisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/230,112

(22) Filed: Aug. 22, 2008

(65) Prior Publication Data

US 2009/0113373 A1   Apr. 30, 2009

(30) Foreign Application Priority Data

Oct. 31, 2007   (JP) ................................. 2007-283393

(51) Int. Cl.
*G06F 17/50* (2006.01)
(52) U.S. Cl. ...................................... 716/110
(58) Field of Classification Search ................ 716/1, 13, 716/100, 110
See application file for complete search history.

(56) References Cited

U.S. PATENT DOCUMENTS

| | | | | |
|---|---|---|---|---|
| 5,187,668 A * | 2/1993 | Okude et al. | ................... | 716/123 |
| 5,801,960 A * | 9/1998 | Takano et al. | ................... | 716/10 |
| 5,984,510 A * | 11/1999 | Guruswamy et al. | ........... | 716/54 |
| 7,143,385 B2 * | 11/2006 | Itou et al. | ......................... | 716/15 |
| 7,472,366 B1 * | 12/2008 | Hetzel et al. | ................... | 716/129 |
| 2003/0023938 A1 * | 1/2003 | Nagasaka et al. | ................. | 716/2 |
| 2007/0162882 A1 * | 7/2007 | Ueda | ............................... | 716/13 |
| 2007/0256045 A1 * | 11/2007 | Lin et al. | ......................... | 716/13 |
| 2009/0077522 A1 * | 3/2009 | Frankle et al. | ................... | 716/12 |
| 2010/0042957 A1 * | 2/2010 | Ueda | ............................... | 716/2 |

FOREIGN PATENT DOCUMENTS

JP   2004-282071   10/2004

OTHER PUBLICATIONS

"Model Based Layout Pattern Dependent Metal Filing Algorithm for Improved Chip Surface Unifomity in the Copper Process", Subarna et al., IEEE 2007, pp. 1-6.
"A Layout Dependent Full-Chip Copper Electroplating Topography Model", J. Luo et al, ICCAD 2005, IEEE, pp. 133-140.

* cited by examiner

*Primary Examiner* — Suchin Parihar
(74) *Attorney, Agent, or Firm* — Staas & Halsey LLP

(57) ABSTRACT

A layout design apparatus that limits the maximum wiring density and the maximum edge length of partial regions when determining wiring layout. After determining the wiring layout, the layout design apparatus inserts a dummy into a partial region having a low wiring density and thereby, the minimum wiring density and the minimum edge length of the partial regions are limited. Thus, the respective wiring densities and respective edge lengths of the partial regions are constrained within a constant range and irregularities in the substrate surface after polishing can be suppressed.

12 Claims, 11 Drawing Sheets

WIRING DENSITY 50 [%]　　WIRING DENSITY 50 [%]　　WIRING DENSITY 50 [%]
EDGE LENGTH  P [$\mu$m]　　EDGE LENGTH  Q [$\mu$m]　　EDGE LENGTH  R [$\mu$m]

| PARTIAL REGION ID | WIRING DENSITY [%] | EDGE LENGTH [μm] |
|---|---|---|
| A-1 | 42 | 1700 |
| A-2 | 28 | 1000 |
| A-3 | 68 | 3000 |
| ⋮ | ⋮ | ⋮ |
| A-i | 50 | 200 |
| ⋮ | ⋮ | ⋮ |
| A-n | 72 | 4200 |

LAYOUT DESIGN APPARATUS, LAYOUT DESIGN METHOD, AND COMPUTER PRODUCT

CROSS-REFERENCE TO RELATED APPLICATIONS

This application is based upon and claims the benefit of priority from Japanese Patent Application No. 2007-283393, filed Oct. 31, 2007, the entire contents of which are incorporated herein by reference.

BACKGROUND OF THE INVENTION

1. Field of the Invention

The present invention relates to layout design of a semiconductor device and post-chemical mechanical planarization (CMP) planarity.

2. Description of the Related Art

Recently, as semiconductor devices become smaller with multilayer wiring, a flat topography of the respective layers has become desirable. Specifically, to improve quality, it has become important to polish copper plated substrate surfaces using CMP technology to evenly planarize the surface during a wiring process in the manufacture of a semiconductor device.

It is common knowledge that post-polishing flatness is dependent on wiring density. Subarna Sinha, Jianfeng Luo, and Charles Chiang in "Model Based Layout Pattern Dependent Metal Filling Algorithm for Improved Chip Surface Uniformity in the Copper Process", Jan. 23, 2007, IEEE, present a technology that maintains the uniformity of wiring densities over an entire layout region by dividing, in a mesh-like pattern, a polished layout region and inserting a dummy into a mesh section having a low wiring density.

Specifically, for example, a wiring density and an edge length of the dummy to be inserted into the mesh are obtained using an equation described in "A Layout Dependent Full-Chip Copper Electroplating Topography Model, ICCAD 2005" by J. Luo, Q. Su, C. Chiang, and J. Kawa. Then, a dummy corresponding to the obtained wiring density and edge length is extracted from a library maintaining plural types of dummies and inserted into an unoccupied region of the mesh. With this configuration, the wiring densities and edge lengths of the respective mesh sections are maintained within constant values and the flatness of the polished substrate surface is improved.

However, according to the conventional art, since wiring layout is not performed with consideration of edge length uniformity, the wire edge lengths of the respective mesh sections after wiring often can be very different from one another. As a result, there has been a problem in that irregularities on the substrate surface after polishing increase, which can deteriorate the performance of the semiconductor device.

Further, as described by Subarna Sinha, et al., in order to uniform the wiring densities and edge lengths of the respective mesh sections, a dummy can be inserted after wiring. However, after the wiring, a library storing dummies for various wiring patterns must be generated. Thus, a problem arises in that the generation of the library results in increased workload as well as increased content stored on a memory.

Meanwhile, although only dummies having typical shapes can be stored, a problem occurs in that an appropriate dummy cannot be inserted and the wiring densities and edge lengths cannot be made uniform, for example, when the wiring density is extremely low and the edge length is extremely great, and when the wiring density and edge length in a mesh after wiring can be in unexpected conditions.

SUMMARY OF THE INVENTION

It is an object of the present invention to at least solve the above problems in the conventional technologies.

A computer-readable recording medium according to one aspect of the present invention stores therein a layout design program that, with respect to a target circuit to be designed and having a layout region partitioned into plural partial regions, causes a computer to execute searching for a wiring path between cells arranged in the layout region, based on a wire edge length of each of the partial regions; and outputting a search result of the searching.

A layout design apparatus according to another aspect of the present invention includes a searching unit that, with respect to a target circuit to be designed and having a layout region partitioned into plural partial regions, searches for, based on a wire edge length of each of the partial regions, a wiring path between cells arranged in the layout region; and an output unit that outputs a search result of the searching unit.

A layout design method according to yet another aspect of the present invention, with respect to a target circuit to be designed and having a layout region partitioned into plural partial regions, includes searching for, based on a wire edge length of each of the partial regions, a wiring path between cells arranged in the layout region; and outputting a search result of the searching.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
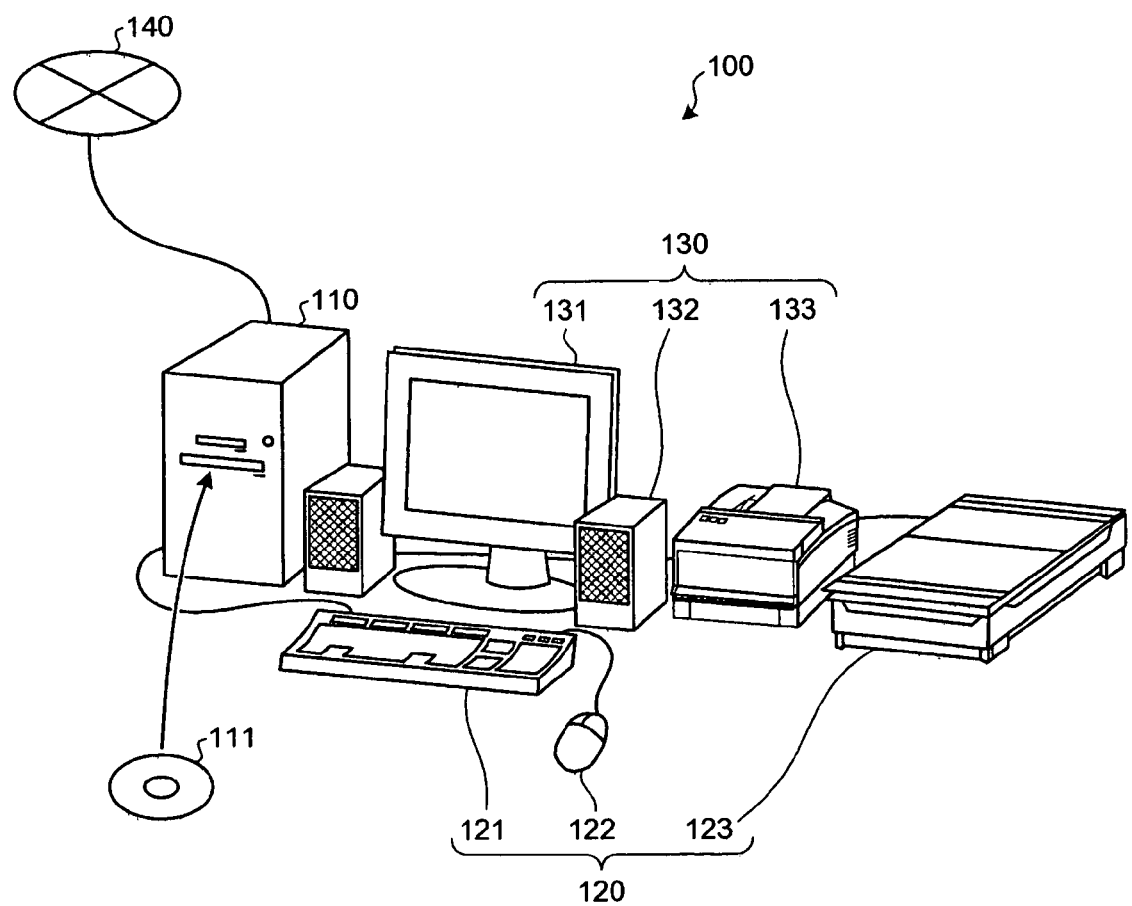
FIG. 1 is a schematic of a hardware configuration of a layout design apparatus according to an embodiment.

FIG. 1 is a schematic of a hardware configuration of a layout design apparatus according to an embodiment. As shown in FIG. 1, a layout design apparatus 100 includes a computer 110, an input device 120, and an output device 130 and is connectable to a network 140 such as a local area network (LAN), wide area network (WAN), or the Internet via a router or a modem (not shown).

The computer 110 includes a central processing unit (CPU), a memory, and an interface. The CPU controls the entire layout design apparatus 100. The memory includes a read-only memory (ROM), a random access memory (RAM), a hard drive (HD), an optical disk 111, and a flash memory. The memory is used as a work area of the CPU.

The memory stores various programs, which are loaded according to an instruction from the CPU. The reading/writing of data from and to the HD and the optical disk 111 are controlled by a disk drive. Further, the optical disk 111 and the flash memory are detachable from the computer 110. The interface controls input from input device 120, output to the output device 130, and transmission/reception to and from the network 140.

Further, the input device 120 includes a keyboard 121, a mouse 122, and a scanner 123. The keyboard 121 includes keys to input text, numerals, and various instructions. Further, the input device 120 can be a touch panel type device. The mouse 122 moves a cursor, determines an area, moves a window, or changes the dimensions for the window. The scanner 123 optically scans an image. The scanned image is imported as image data and stored in the memory of the computer 110. The scanner 123 can have an optical character recognition (OCR) function.

Further, the output device 130 includes a display 131, a speaker 132, and a printer 133. The display 131 displays a cursor, icons, toolboxes, and data such as documents, images, and function information. The speaker 132 outputs sound such as a sound effect, a read-out voice, and the like. The printer 133 outputs image date and document data.

Generally, during a wiring process of the manufacture of a semiconductor device, a copper plated substrate surface is polished using a CMP technique to planarize respective layers in a multilayer wiring process. It is preferable that the wiring densities be uniform over the entire layout.

When the distribution of wiring densities is not even, irregularities on the polished substrate surface increase due to differences in the quality of wiring metals and insulators. Conventionally, there has been a method involving the insertion of a dummy that is not related to electrical signal transmission into an unoccupied region on the layout to uniform the wiring densities.

However, even when the wiring densities are made uniform, a sufficiently flat substrate surface cannot be obtained. This problem arises because the planarization after polishing depends not only on the wiring densities but also on wire edge lengths. When the distribution of the edge lengths is not even, irregularities on the substrate surface increase, similarly as explained above.

Figure 2:
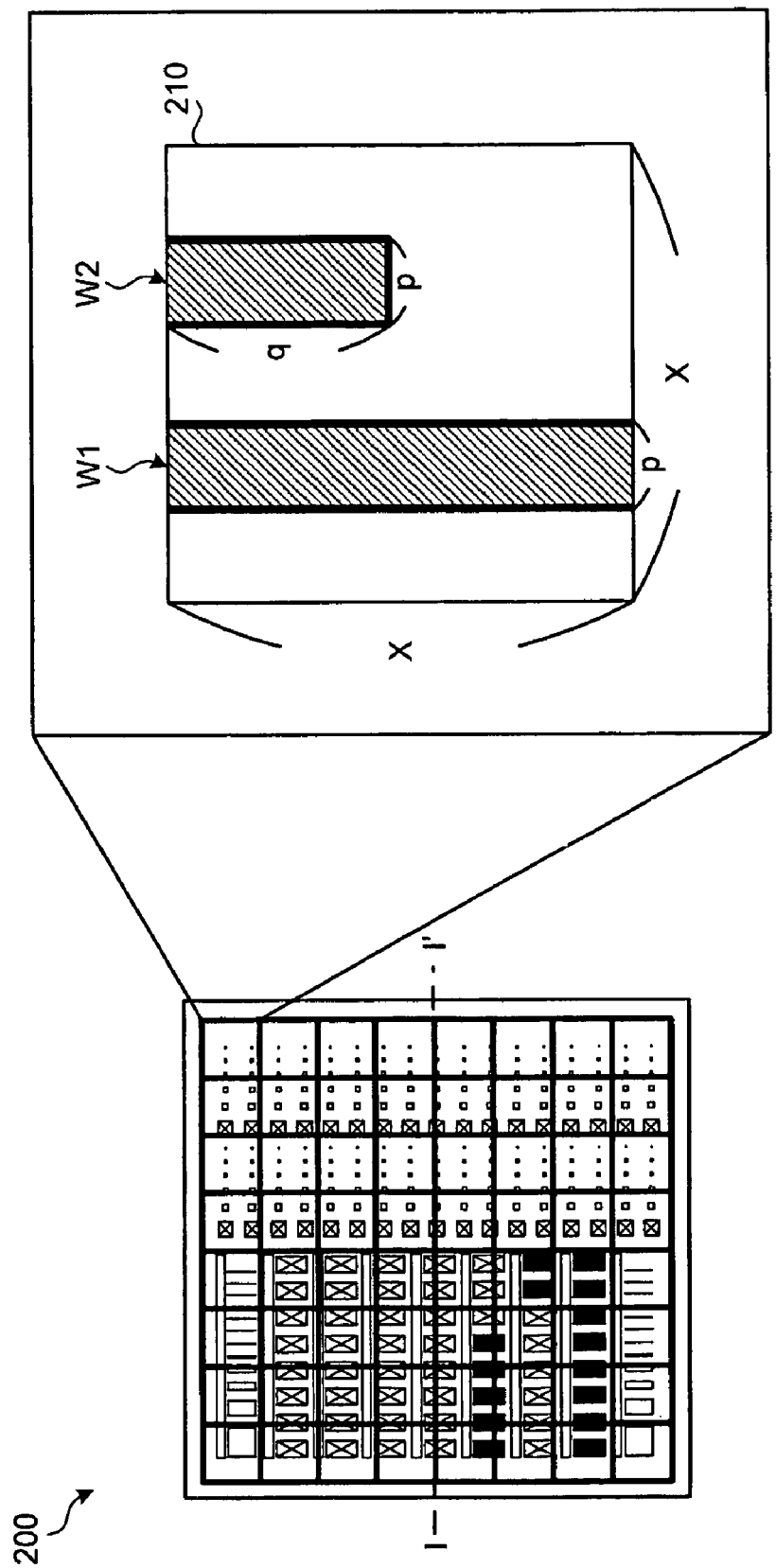
FIG. 2 is a schematic of an example of a semiconductor integrated circuit.

A problem of a conventional art is described. FIG. 2 is a schematic of an example of a semiconductor integrated circuit. As shown in FIG. 2, a semiconductor integrated circuit 200 is divided into plural partial regions (for example, a partial region 210). Specifically, the semiconductor integrated circuit 200 is partitioned in a mesh-like pattern into square areas of X μm.

Here, taking the partial region 210 as an example, wires W1, W2 having a wire width of p μm are formed in the partial region 210. The edge length for the partial region 210 (indicated by thick line) is the sum of the edge length of the wire W1 (2X μm) and the edge length of the wire W2 ((p+2q) μm), that is, (2X+p+2q) μm.

As described above, the wiring density and the edge length of the partial region varies according to the wiring pattern in the partial regions, respectively. For example, when plural wires thinner than the length of the partial region are formed, the wire edge length tends to be greater compared to other partial regions. On the other hand, when a wide wire is formed, the wire edge length tends to be smaller than other partial regions.

Figure 3:
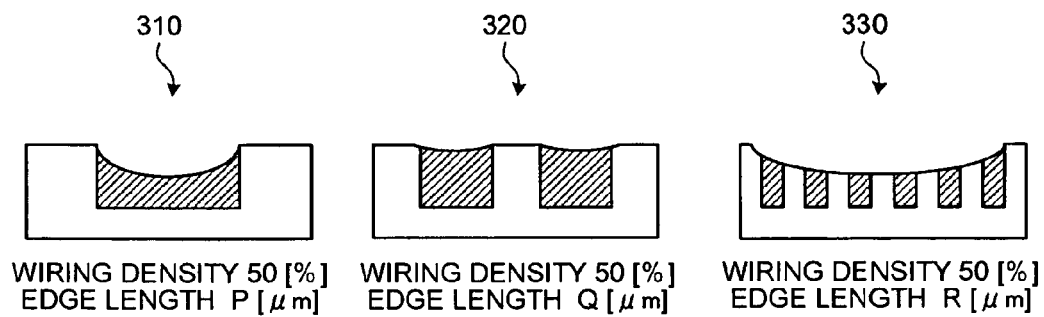
FIG. 3 is a schematic depicting a problem associated with a conventional art.

FIG. 3 is a schematic depicting a problem associated with a conventional art. FIG. 3 depicts sectional views of partial regions 310, 320, and 330. Here, the sectional views are taken along the line I-I' of the semiconductor integrated circuit shown in FIG. 2, for example. As shown in FIG. 3, wires in different patterns are formed in the respective partial regions 310, 320, and 330.

Thus, the wire edge lengths of the partial regions 310 to 330 differ, respectively. Specifically, the wire edge length of the partial region 310 is P μm, the wire edge length of the partial region 320 is Q μm, and the wire edge length of the partial region 330 is R μm, where P>Q>R. The wiring densities of the partial regions 310 to 330 are uniform at 50

Here, the irregularities on the polished substrate surfaces differ for the partial regions 310 to 330, respectively. The substrate surface of the partial region 320 is the most planarized. In other words, even when the wiring densities of the partial regions 310 to 330 are uniform, the irregularities on the polished substrate surface vary due to differences in wire edge lengths.

As a result, for example, at a recessed portion, the wiring metal is polished too deep, and this causes increased wiring resistance and circuit performance can be reduced. Further, at a convex portion, excess wiring metal left there can cause a focal shift problem, and an irregularity of the wiring width can increase.

In view of this problem, according to the present embodiment, when a wiring layout is determined, the maximum wiring density and the maximum edge length of the partial regions are limited. Further, when the wiring is arranged, a dummy is inserted into a partial region having a low wiring density to limit the minimum value of the wiring density and the edge length among the partial regions. With this configuration, the wiring densities and the edge lengths of the partial regions are within a constant range, respectively and differences in the degree of irregularity among the polished substrate surfaces are reduced.

Figure 4:
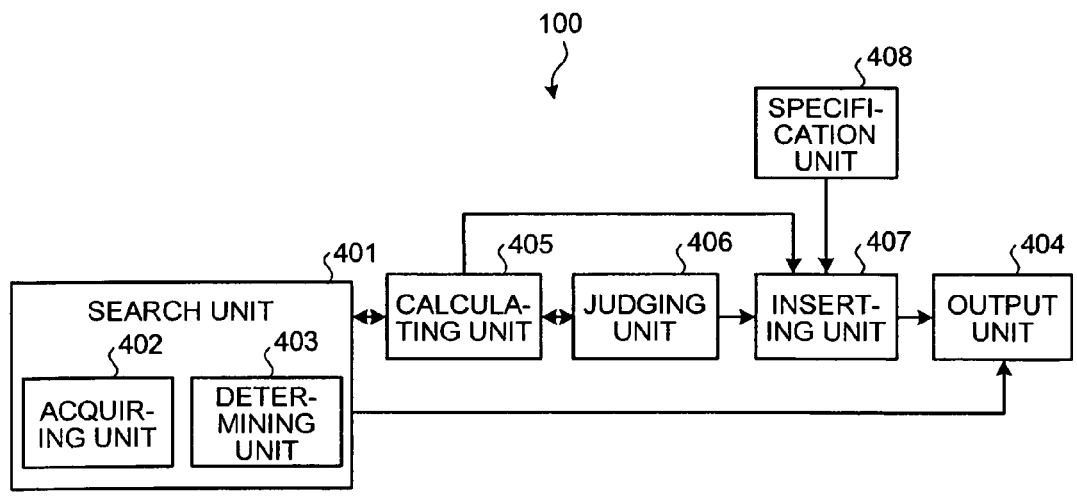
FIG. 4 is a block diagram of a functional configuration of the layout design apparatus.

FIG. 4 is a block diagram of a functional configuration of the layout design apparatus according to the present embodiment. As shown in FIG. 4, the layout design apparatus 100 includes a search unit 401, an acquiring unit 402, a determining unit 403, an output unit 404, a calculating unit 405, a judging unit 406, an inserting unit 407, and a specification unit 408.

The respective functions of the units 401 to 408 can be realized by causing the CPU to execute programs related to the respective functions and stored in the memory of the layout design apparatus 100, or by using an input/output interface. Further, data output from the respective functions is stored in the memory. As shown in FIG. 4, destination functions, indicated by the arrows, read from the memory, data output from a source function and cause the CPU to execute a program related to the function.

The search unit 401 has a function of searching for, based on wire edge lengths of respective partial regions obtained by partioning a layout region of a target circuit to be designed, a wiring path between cells arranged in the layout region. Here, the wire edge length represents a length along the perimeter of a wire.

Specifically, for example, the layout region of the target circuit is divided in a mesh-like pattern into plural partial regions based on circuit information concerning the target circuit. The circuit information is electronic data including information such as a netlist and a floorplan of the target circuit (for example, the semiconductor integrated circuit 200 shown in FIG. 2).

The circuit information can be acquired from an external source (not shown) or through an input operation by a user, or can be obtained by extraction from a database or a library (not shown). Further, the shape and/or dimensions for the divided partial regions can be set by a user through the manipulation of the keyboard 121 or the mouse 122 shown in FIG. 1, for example.

After the layout region is divided into plural partial regions, the search unit 401 extracts a group of cells for wiring from among plural cells arranged in the layout region and searches for a wiring path between the cells. Here, the search unit 401 judges the wire edge lengths of the respective partial regions and searches for a wiring path from a source cell to a destination cell.

The search process of the search unit 401 is repeatedly executed until no cells remain to be extracted for wiring. It is assumed that the wire edge lengths of the respective partial regions vary each time a wiring path is found. In other words, the search unit 401 respectively judges the wire edge lengths of the partial regions, which are successively changed, to search for a wiring path between the target cells to be wired.

The acquiring unit 402 has a function of acquiring wire edge lengths of adjacent regions (partial regions adjacent to a given partial region, exclusive of the partial regions through which the wiring path subject to the search already passes) when the search unit 401 has found the wiring path up to the given partial region. The given partial region is an arbitrary partial region, such as a partial region to which the wiring path has been found, or a partial region in which a source cell is disposed.

Specifically, for example, the given partial region is an arbitrary region during a search using a wiring algorithm. More specifically, for example, the given partial region is a partial region during a search according to a rule related to wiring lengths or a congestion degree, or a design rule. The design rule is a rule for checking whether the wiring layout meets a process design rule.

The wire edge lengths of the adjacent regions are calculated by the later described calculating unit 405 when the wiring path is found up to the given partial region, for example. Or, the wire edge lengths of the respective partial regions can be calculated each time a wiring path between the cells is found entirely. The calculation result calculated by the calculating unit 405 is stored in a memory such as a ROM or a RAM, for example. When the wiring path is found to the given partial region, the acquiring unit 402 reads the wire edge lengths of the adjacent regions from the memory.

The determining unit 403 has a function of determining, based on an acquisition result of the acquiring unit 402, a partial region to which the search unit 401 searches for the wiring path. Specifically, the determining unit 403 can determine a partial region having the smallest wire edge length acquired by the acquiring unit 402, for example.

With this configuration, the maximum wire edge length among the partial regions can be constrained and the differences in the wire edge lengths over the entire layout region can be reduced. When a partial region having a connection destination cell is among the adjacent regions, this partial region can be determined as a partial region to which the search unit 401 searches for the wiring path.

The acquiring unit 402 can acquire wiring path candidates between the cells, the wiring path candidates being searched for according to the design rule. Specifically, the wiring path candidates are searched for with consideration of a process design rule and the search result can be acquired by the acquiring unit 402, for example.

In this case, among the wiring path candidates acquired by the acquiring unit 402, the determining unit 403 can determine as a wiring path between the cells, a wiring path candidate having the smallest wire edge length over all the partial regions through which the wiring path candidate passes. In other words, when there are plural wiring path candidates, the determining unit 403 determines as the wiring path between the cells, a wiring path candidate having the smallest cumulative wire edge length over the partial regions positioned on the path thereof.

The search unit 401 can search for a wiring path between cells based on the respective wiring densities of the partial regions. Here, the wiring density is a ratio of a surface area of a partial region to a surface area of wiring formed on the partial region, for example. Specifically, for example, when a wiring path to a given partial region is found through a search by the search unit 401, the acquiring unit 402 acquires a wiring density of an adjacent region of the given partial region. The wiring density of the adjacent region is, for example, calculated by the later described calculating unit 405, similarly to the above described wire edge length.

In this case, the determining unit 403 can determine a partial region having the lowest wiring density obtained by the acquiring unit 402 as a partial region to which the wiring path is searched for. With this configuration, the maximum wiring density among the partial regions can be constrained and variations in the wiring density over the entire layout region can be reduced.

The determining unit 403, from among the wiring path candidates acquired by the acquiring unit 402, can determine as a wiring path between the cells, a wiring path candidate having the lowest wiring density over all the partial regions through which the wiring path candidate passes. In other words, when there are plural wiring path candidates, the determining unit 403 determines as a wiring path between the cells, a wiring path candidate having the smallest cumulative wiring density over the partial regions through which the wiring path candidate passes.

Further, the acquiring unit 402 can acquire a wiring cost of each partial region. The wiring cost is an index indicating the difficulty of wiring and is calculated based on wiring density, edge length, wiring length, and congestion degree of each partial region, and a design rule, for example. Specifically, for example, a higher wiring cost indicates a higher wiring difficulty and a lower wiring cost indicates a higher wiring ease.

A computation rule of the wiring cost can be arbitrarily determined. For example, when the wiring density is equal to or greater than a predetermined threshold value, "j" is added and when the design rule is not satisfied, "k" is added. In this case, the determining unit 403 can determine a partial region having the lowest wiring cost acquired by the acquiring unit 402 according to partial region, for example, as the partial region to which the wiring path is searched for.

Figures 5, 6:
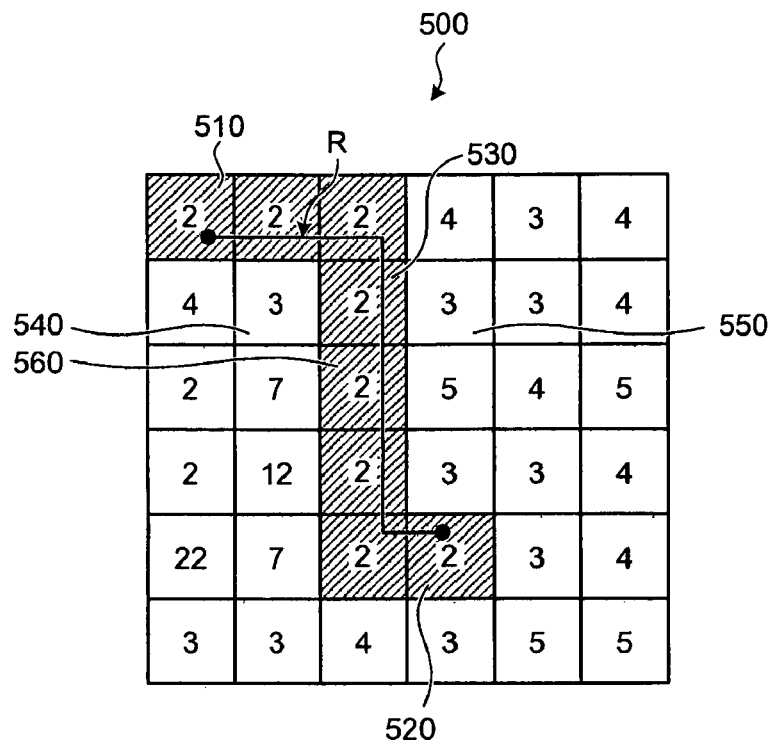
FIG. 5 is a schematic of an example of a wiring path.
FIG. 6 is a schematic of an example of a calculation result.

Here, an example is described of a process for determining, based on the wiring cost, a partial region to which the wiring path is searched for. FIG. 5 is a schematic of an example of a wiring path. In a layout region 500 shown in FIG. 5, a wiring path R between cells that are to be connected is depicted. The wiring path R is a path from a partial region 510 in which a connection source cell is disposed to a partial region 520 in which a connection destination cell is disposed.

Further, in the layout region 500, numeric values indicating wiring costs of the respective partial regions are shown. Here, with respect to the partial regions from the partial region 510 to the partial region 520, the determining unit 403 determines a partial region having the lowest wiring cost among the adjacent regions of the partial region as a partial region to which the wiring path is searched for.

Here, for example, taking a partial region 530 as the given partial region, a partial region 560 having the lowest wiring cost among adjacent regions 540, 550, 560 is determined as the partial region to which the wiring path is to be searched for. As described above, the wiring path R from the partial region 510 to the partial region 520 is searched for by determining, as a partial region to which the wiring path R is searched for, the partial region having the lowest wiring cost among the partial regions along the search.

The output unit 404 has a function of outputting a search result obtained by the search unit 401. Specifically, for example, the output unit 404 can output layout information indicating a search result for a wiring path between cells that are to be connected and placed in the layout region, and the like. The format of the data output from the output unit 404 can be any one of display on the display 131, printing by the printer 133, data output (storing) to the memory, and data transmission to an external computer device.

The calculating unit 405 has a function of calculating the wiring density and the edge length for each partial region through which the wiring path, found through a search by the search unit 401, passes. Specifically, for example, the calculating unit 405 can calculate the wiring density and the edge length for each partial region based on the layout information indicating the search result obtained by the search unit 401. The layout information is, for example, electronic data in a binary format for writing mask patterns such as GDSII data.

The judging unit 406 has a function of judging, based on the wiring density calculated by the calculating unit 405, whether a wiring density of a partial region is less than a predetermined limit. The wiring density limit, for example, is judged based on a CMP simulation result or actual values measured in the past (difference in levels of concave and convex portions) and can be arbitrarily set by a user using the keyboard 121 or mouse 122 shown in FIG. 1.

The limit can be a specific numeric value or a specific range of values. When a specific range is set as the wiring density limit, the judging unit 406 judges whether the wiring density of the partial region is within a predetermined range limit in terms of the wiring density. Further, the limit can be set as specific range together with a desired value. Specifically, for example, a limit value A % can be a range of $40 \leq A \leq 80$ and a desired value of $A=70$.

An example of a calculation result by the calculating unit 405 is described. FIG. 6 is a schematic of an example of the calculation result. Here, a case in which a layout region of a design target circuit is divided into "n" partial regions is described. As shown in FIG. 6, a calculation result 600 includes wiring information 600-1 to 600-$n$ for partial regions A-1 to A-n, respectively.

Specifically, the wiring information 600-1 to 600-$n$ indicates a partial region ID, a wiring density, and an edge length for the partial regions A-1 to A-n, respectively. The partial region ID is information identifying the partial regions A-1 to A-n, respectively. The wiring density is information indicating respective wiring densities of the partial regions A-1 to A-n. The edge length is information indicating respective wire edge lengths of the partial regions A-1 to A-n.

Taking the wiring information 600-$i$ as an example, the wiring density of the partial region A-i is 50% and the wire edge length is 200 μm. Here, for example, when the wiring density limit is set at 70%, the judging unit 406 judges that the wiring density of the partial region A-i is less than the limit.

The inserting unit 407 has a function of inserting a dummy into an unoccupied space in a partial region that is judged, by the judging unit 406, to have a wiring density less than the wiring density limit, based on the edge length calculated by the calculating unit 405. The dummy is a dummy metal wire which is not related to electrical signal transmission. The shape of the dummy can be arbitrarily set and the dummy can be, for example, a rectangular, triangular, or circular shape.

Specifically, the calculating unit 405 calculates the dimensions for a dummy based on a wiring density of a partial region (hereinafter, "insertion target area") which is judged to have a wiring density less than the wiring density limit. More specifically, for example, when the wiring density of the insertion target area is judged to be less than a lower limit of the predetermined range, the calculating unit 405 calculates the dimensions for a dummy having a wiring density such that the wiring density of the insertion target area becomes a given desired value.

The inserting unit 407 inserts the dummy having the dimensions calculated by the calculating unit 405 into an unoccupied space of the insertion target area. With this configuration, the minimum wiring density among the partial regions can be constrained and variations in the wiring density over the entire layout region can be reduced.

Further, when the dimensions for the dummy are calculated, the wire edge length of the insertion target area can be considered. Specifically, the judging unit 406 judges whether the edge length of the insertion target area is smaller than an edge length limit. The edge length limit can be arbitrarily set by a user using, for example, the keyboard 121 or mouse 122 shown in FIG. 1, similarly to the wiring density limit.

The calculating unit 405 calculates dimensions for the dummy based on the judgment result obtained by the judging unit 406. Specifically, for example, the calculating unit 405 can calculate dimensions for the dummy based on the edge length of the partial region that is judged, by the judging unit 406, to have an edge length smaller than the edge length limit.

More specifically, for example, when the edge length of the insertion target area is judged to be smaller than a lower limit of a predetermined range, the calculating unit 405 calculates dimensions for the dummy such that the edge length of the insertion target area becomes a given desired value. The inserting unit 407 inserts the dummy having the dimensions calculated by the calculating unit 405 into an unoccupied space of the insertion target area. With this configuration, the minimum wire edge length among the partial regions can be constrained and differences in wire edge lengths over the entire layout region can be reduced.

When the dimensions for the dummy are calculated, the calculating unit 405 can give priority to the wiring density limit over the wire edge length limit. Specifically, for example, when dimensions are calculated to meet the edge length limit but the wire density limit is exceeded, the calculating unit 405 newly calculates dimensions to meet the edge length limit as much as possible within a range that meets the wiring density limit. On the other hand, for example, when dimensions meeting the wiring density limit are calculated, but the edge length limit is exceeded, the calculating unit 405, giving priority to the wiring density limit, does not repeat the dimension calculation.

Figure 7:
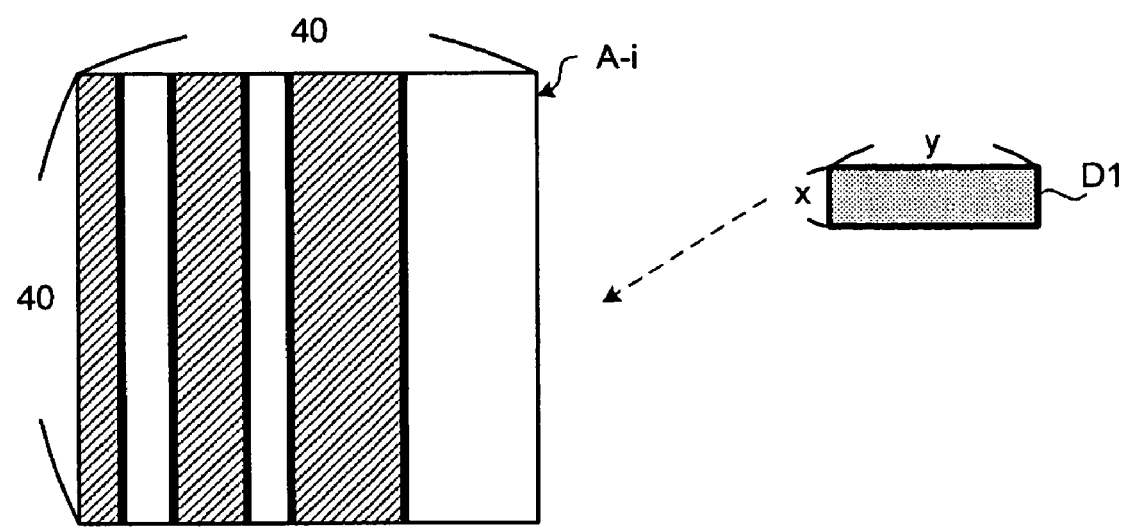
FIG. 7 is a schematic of an example of a partial region.

An example of the process for calculating dimensions for a dummy is described. Taking the wiring information **600-*i* shown in FIG. 6, dimensions for the dummy to be inserted into the partial region A-i are calculated. FIG. 7 is a schematic of an example of the partial region. As shown in FIG. 7**, the partial region A-i is a square region having a length of 40 µm (the entire area is 1600 µm²).

Further, the wiring density of the partial region A-i is 50% and the edge length is 200 µm (see the wiring information **600-*i***). Here, it is assumed that the wiring density limit A % of the respective partial region is set as "$40 \leq A \leq 80$" and the edge length limit B µm is set as "$1000 \leq B \leq 4000$."

Further the desired value of the limit value A is set as 70% and the desired value of the limit value B is set as 2000 µm. The desired values indicate optimal values of the wiring density and the edge length and are not values that are required to be satisfied all the time. Further, the shape of the dummy D1 is limited to a rectangular shape (dimensions: x µm, y µm), where the smallest length of one side is 0.5 µm and variable by a minimum unit of 0.1 µm as set in advance.

The calculating unit 405 calculates, based on the wiring information **600-*i***, a wiring density and an edge length to be added within the limit values A, B and a wiring density and an edge length to be added to be the desired values of the limit values A, B. Here, a wiring density increased by adding the dummy D1 is referred to as a % and an edge length increased by adding the dummy D1 is referred to as b µm. In this case, the wiring density to be increased within the limit value A is $0 \leq a \leq 30$ and the edge length to be increased within the limit value B is $800 \leq b \leq 3800$.

The wiring density to be added to obtain the desired value of the limit value A is 20% (320 µm2) and the edge length to be added to obtain the desired value of the limit value B is 1800 µm. Then, based on the wiring density and edge length to be added to obtain the desired values, the calculating unit 405 calculates optimal dimensions and the optimal number of dummies D1 so that the wiring density and edge length of the partial region A-i become the desired values.

For example, the length of one side of the dummy D1 is fixed at "x=0.7 µm" and the length of the other side y µm is properly determined. Here, the value of y µm can be determined based on the ratio between the wiring density (320 µm2) required to obtain the desired value of the limit value A and the edge length (1800 µm) required to obtain the desired value of the limit value B.

Specifically, as shown in the following equation (1), the calculating unit 405 calculates a value of the y µm so that the ratio of the surface area (0.7×y µm2) of the dummy D1 to the edge length (2×(0.7+y) µm) of the dummy D1 becomes the ratio of the wiring density to be added to obtain the desired value of the limit value A to the edge length to be added to obtain the desired value of the limit value B.

$$320/1800 = (0.7 \times y)/2 \times (0.7 + y) \quad (1)$$

When the length of one side y µm of the dummy D1 is calculated using equation (1), y becomes y≅0.7. As a result, the dimensions for the dummy D1 are determined to be "x=0.7, y=0.7". Further, when the wiring density (320 µm2) to be added to obtain the desired value of the limit value A is divided by the surface area (0.49 µm2) of the dummy D1, the number of dummies can be obtained. Here, the number of the dummies D1 is 653 (320/0.49≅653).

The length of one side of the dummy D1 to be fixed can be set arbitrarily from a predetermined group of numeric values (for example, "0.5, 0.6, 0.7, 0.8, . . . ") Further, the shape of the dummy D1 can be limited to a square having a length of a determined numeric value. When the wiring width of the dummy D1 is limited, the length of one side of the dummy D1 can be fixed to the wiring width.

Then, the inserting unit 407 inserts a dummy D1 having a size calculated by the calculating unit 405 into an unoccupied space in the insertion target area. Here, the inserting unit 407 inserts the dummy D1 so that the respective dummies D1 do not overlap each other and are not adjacent to each other. Specifically, for example, an insertion position of the dummy D1 is correctly judged using a geometric data structure or bitmap related to the design target circuit.

Figure 8:
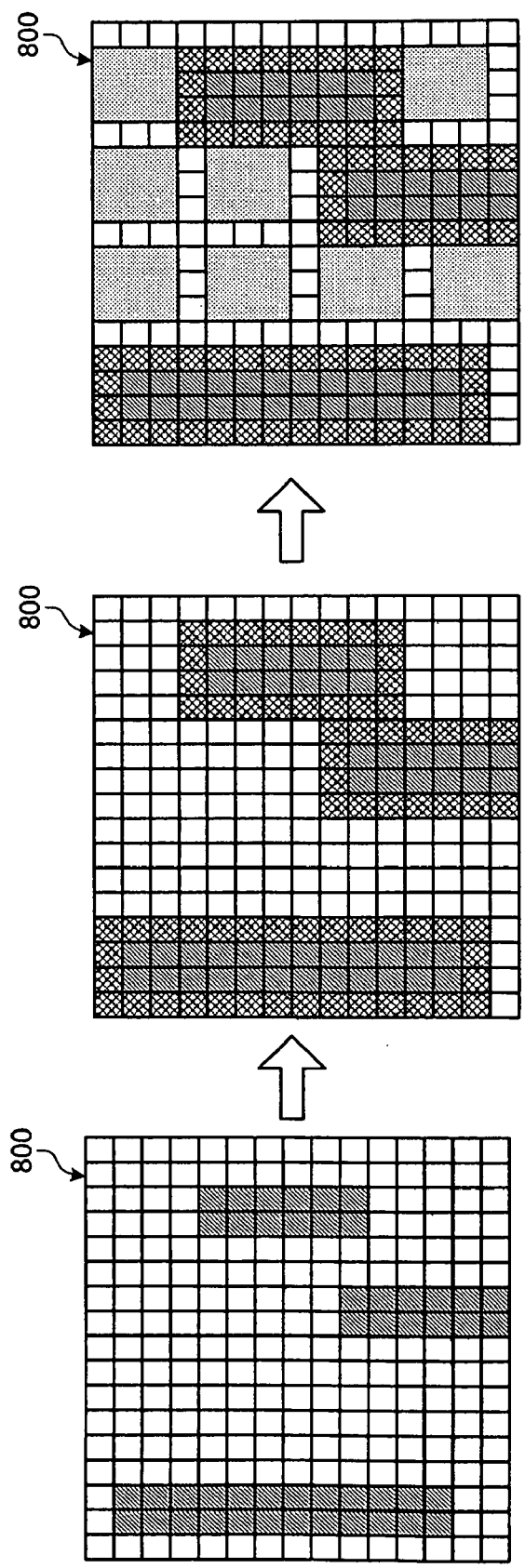
FIG. 8 is a diagram outlining an insertion process.

FIG. 8 is a diagram outlining an insertion process. As shown in FIG. 8, (1) an insertion target area 800 is divided in a mesh-like manner. Based on the search result of the search unit 401, a wiring position of wiring formed in the insertion target area 800 is specified and the specified wiring position is filled as depicted on the far left of FIG. 8.

Subsequently, (2) a minimum required space between the wiring and the dummy is specified based on a design rule and the like, and the specified minimum required space is filled as depicted in the center of FIG. 8. Then, (3) an insertion position to which the dummy is specified in the unoccupied space exclusive of the area already filled, is filled as depicted on the far right of FIG. 8.

Here, the insertion position is specified such that the respective dummies do not overlap. Lastly, the inserting unit 407 inserts a dummy into the unoccupied space in the insertion target area 800 based on bitmap data indicating the process result of the processes (1) to (3).

Returning to the description of FIG. 4, the judging unit 406 has a function of judging whether the wiring density of the insertion target area, after the inserting unit 407 inserts the dummy, is less than the wiring density limit. Specifically, for example, the calculating unit 405 calculates a wiring density of the insertion target area after the insertion of the dummy, and the judging unit 406 judges whether the calculation result is less than the wiring density limit.

Here, when the judging unit 406 judges that the calculation result is less than the limit value, the calculating unit 405 can newly calculate dimensions different from the dimensions for the inserted dummy. In this case, the inserting unit 407 can insert a dummy having the dimensions newly calculated by the calculating unit 405 to the unoccupied space in the insertion target area to replace the previous dummy.

As described above, a series of the process of the calculating unit 405, inserting unit 407, and judging unit 406 can be repeatedly executed until the judging unit 406 judges the calculation result to be equal to or greater than the wiring density limit. Further, as a result of the insertion of the dummy, when the judging unit 406 judges the calculation result to be less than the wiring density limit, a user can arbitrarily change the dimensions for the dummy.

The specification unit 408 has a function of receiving the dimensions for the dummy. Specifically, for example, a user can arbitrarily specify the dimensions for the dummy by operating the keyboard 121 or the mouse 122 shown in FIG. 1. In this case, when the judging unit 406 judges that the calculation result is less than the limit value, the inserting unit 407 can insert the dummy having the dimensions specified by the specification unit 408 to an unoccupied space in the insertion target area.

Further, the judging unit 406 can judge whether the dummy having the dimensions calculated by the calculating unit 405 or the dimensions specified by the specification unit 408 can be inserted into the unoccupied space in the insertion target area. Specifically, for example, the judging unit 406 judges whether an insertion position for the dummy exists based on the bitmap data shown in FIG. 8. Here, when the judging unit 406 judges that the dummy cannot be inserted, the calculating unit 405 can calculate new dimensions, or the specification unit 408 can receive dimensions specified by a user.

The output unit 404 has a function of outputting an insertion result for a dummy insertion by the inserting unit 407. Specifically, for example, the output unit 404 outputs layout information (such as GDSII data) indicating an insertion result in which a dummy has been inserted into an unoccupied space of the insertion target area.

Figure 9:
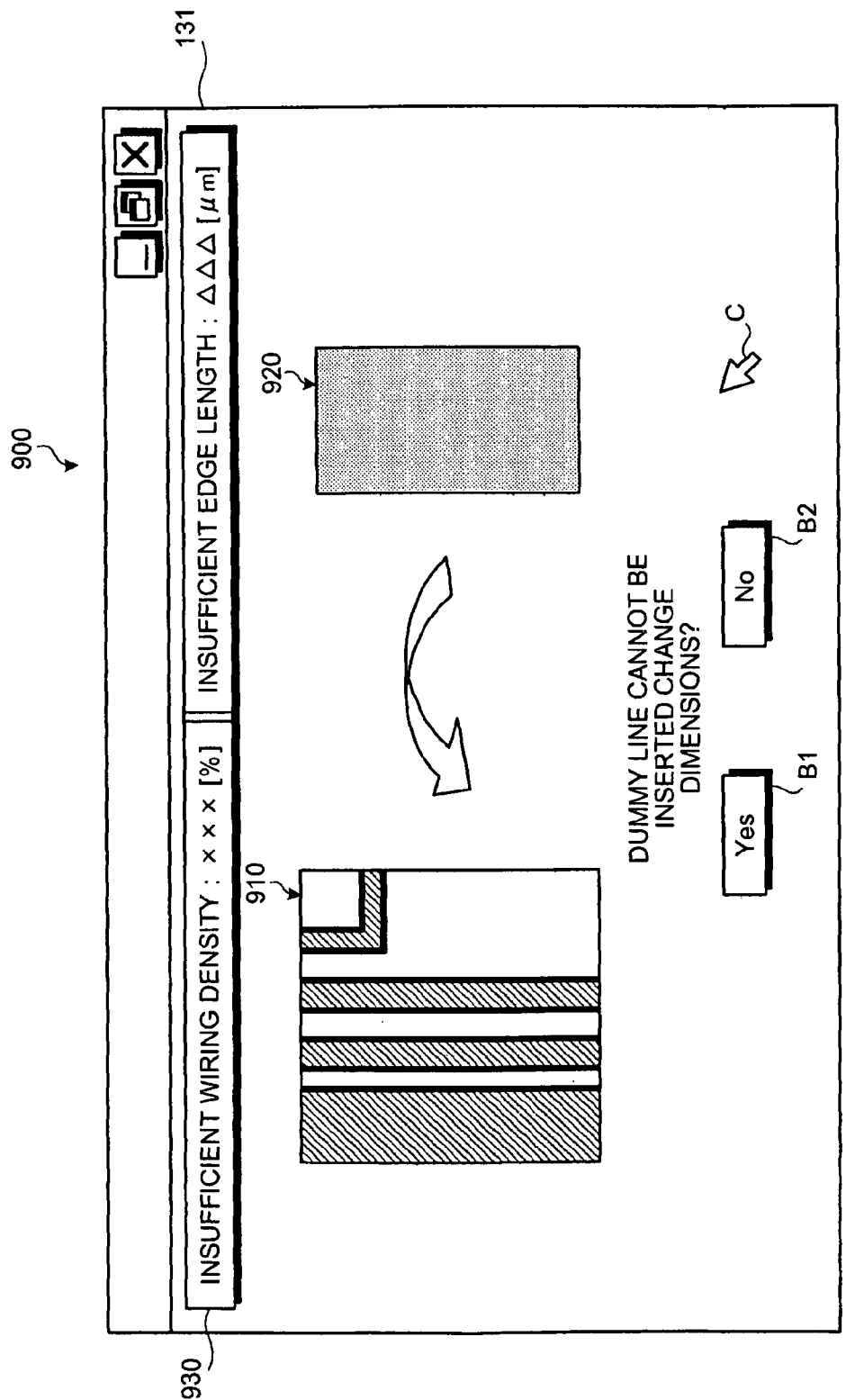
FIG. 9 is schematic depicting an example of a screen shown on a display.
Figure 10:
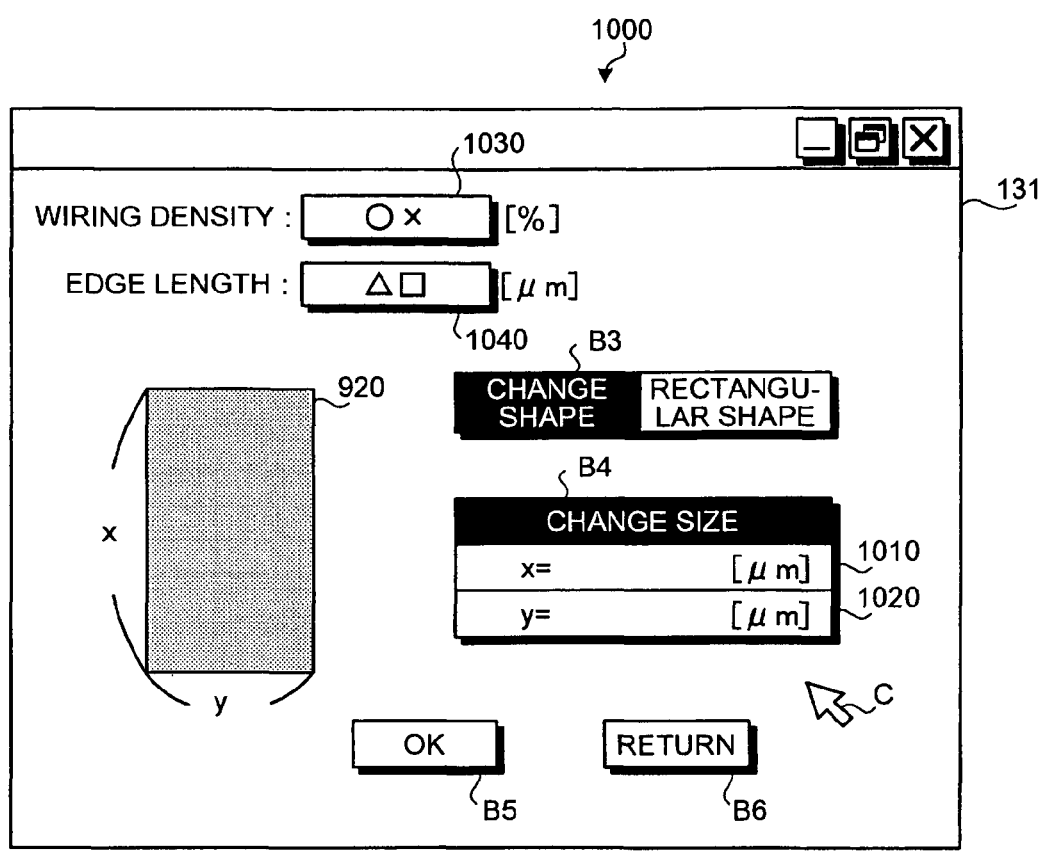
FIG. 10 is a schematic depicting another example of a screen shown on the display.

An example of a screen for receiving a dimension specification from a user is described. FIGS. 9 and 10 are schematics depicting examples of the screen shown on the display. As shown in FIG. 9, the display 131 shows a modification screen 900 for modifying the dimensions of a dummy 920 that is to be inserted to an insertion target area 910. Further, a box 930 indicates a wiring density and an edge length that respectively are insufficient to obtain given desired values.

In the modification screen 900, a user can move a cursor C and click one of buttons B1, B2 to determine whether to change the dimensions for the dummy 920. Specifically, when the user moves the cursor C and clicks the button B1, the screen changes to a modification screen 1000 shown in FIG. 10. Further, when the user moves the cursor C and clicks the button B2, the size specification operation is finished.

When the user moves the cursor C and clicks a button B3 in the modification screen 1000, the shape of the dummy 920 (a rectangular, triangular, circular shape and the like) can be determined. Here, a rectangular shape is determined. Further, when the user moves the cursor C and clicks a button B4, the user can input dimensions for the dummy 920.

Here, lengths of each side (x μm, y μm) of the dummy 920 can be input. Specifically, the user moves the cursor C to the boxes 1010, 1020 and inputs arbitrary numeric values. The user can determine which number to input by referring to the content displayed in the box 930 shown in FIG. 9.

When numeric values are input to the box 1010 or/and the box 1020, according to the input numeric values, the dimensions for the dummy 920 are modified and the numeric values of the wiring density (surface area) and the edge length, shown in the boxes 1030, 1040, regarding the dummy 920 change.

When the user moves the cursor C and clicks a button B5, the shape and dimensions of the dummy 920 are determined according to the determined shape and input numeric values. When the user clicks a button B6, the display returns to the modification screen 900 shown in FIG. 9. As described above, the user operates the change screens 900, 1000 to arbitrarily specify the shape and dimensions for the dummy 920 inserted to the insertion target area 910.

According to the present embodiment, the dimensions for a dummy are computed according to a wiring density and an edge length of an insertion target area; however, the invention is not limited hereto. Specifically, for example, the dimensions of typical dummies can be stored in a library in advance. In this case, the a dummy having appropriate dimensions for a wiring density and an edge length of an insertion target area is extracted from the library and inserted into an unoccupied space of the insertion target area.

Further, when dummy insertion does not achieve a wiring density of the insertion target area reaching the wiring density limit, dimensions for a new dummy can be calculated based on the dimensions for the dummy that has been inserted. With this configuration, calculations related to the process for computing the dimensions for the dummy can be reduced.

Figure 11:
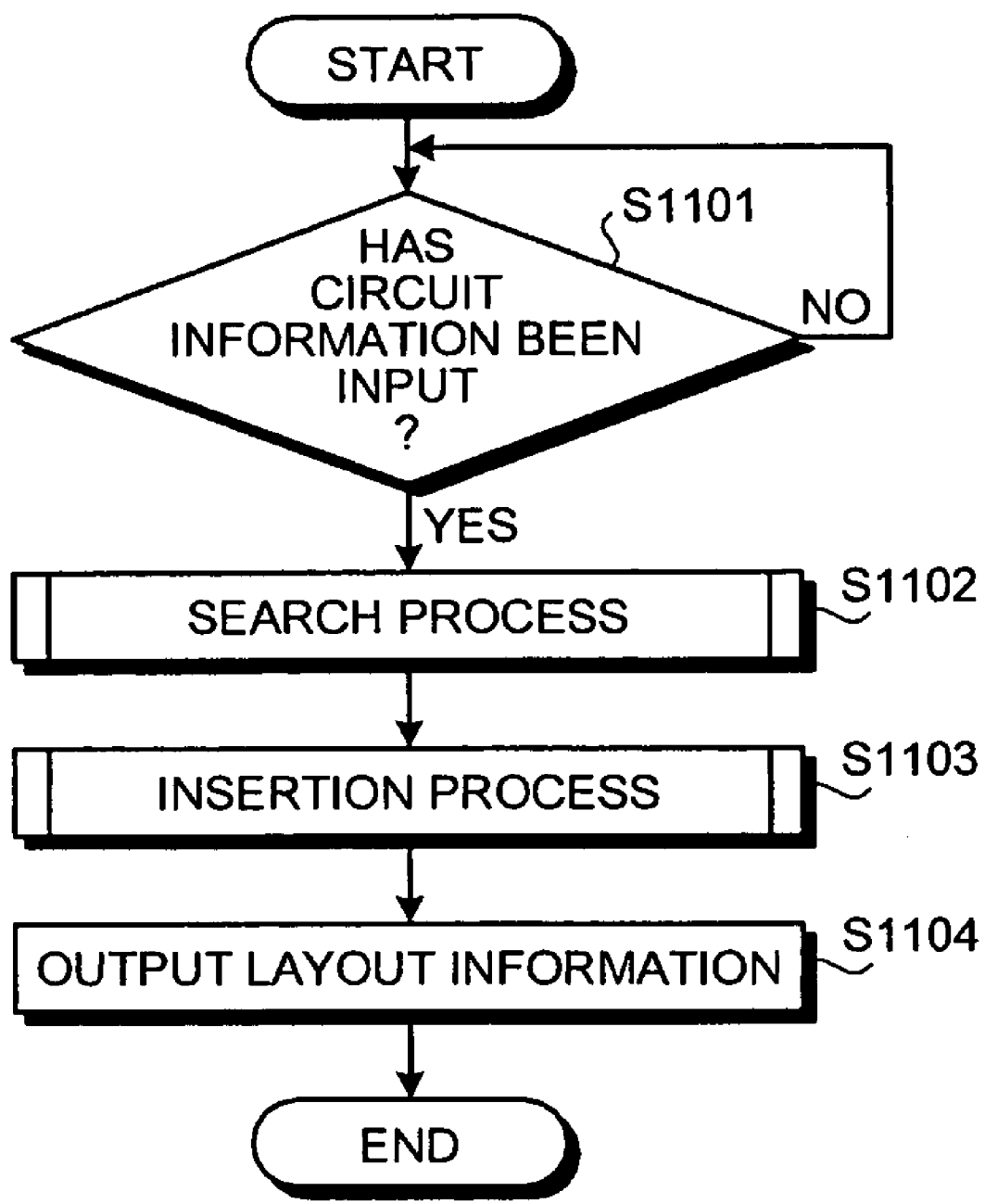
FIG. 11 is a flowchart of an example of a layout design process of the layout design apparatus.

FIG. 11 is a flowchart of an example of a layout design process of the layout design apparatus. As shown in the flowchart of FIG. 11, it is judged whether circuit information related to a design target circuit is has been input (step S1101).

Waiting occurs for the input of the circuit information (step S1101: NO), when the circuit information is input (step S1101: YES), based on respective wire edge lengths of partial regions obtained by partitioning a layout region based on the input circuit information, the search unit 401 executes a search process to search for a wiring path between cells disposed in the layout region of a design target circuit (step S1102).

Then, the inserting unit 407 executes an insertion process for inserting a dummy into an unoccupied space in the insertion target area (step S1103). The output unit 404 lastly outputs layout information related to the design target circuit (step S1104), and a series of the process ends.

With this process, since a wiring path is searched for taking into consideration the wire edge length of a partial region, differences in the wire edge lengths over the entire wired layout region can be constrained. Further, since a dummy is inserted to a partial region having a low wiring density after wiring, differences in the wiring density over the entire layout region can be constrained.

Figure 12:
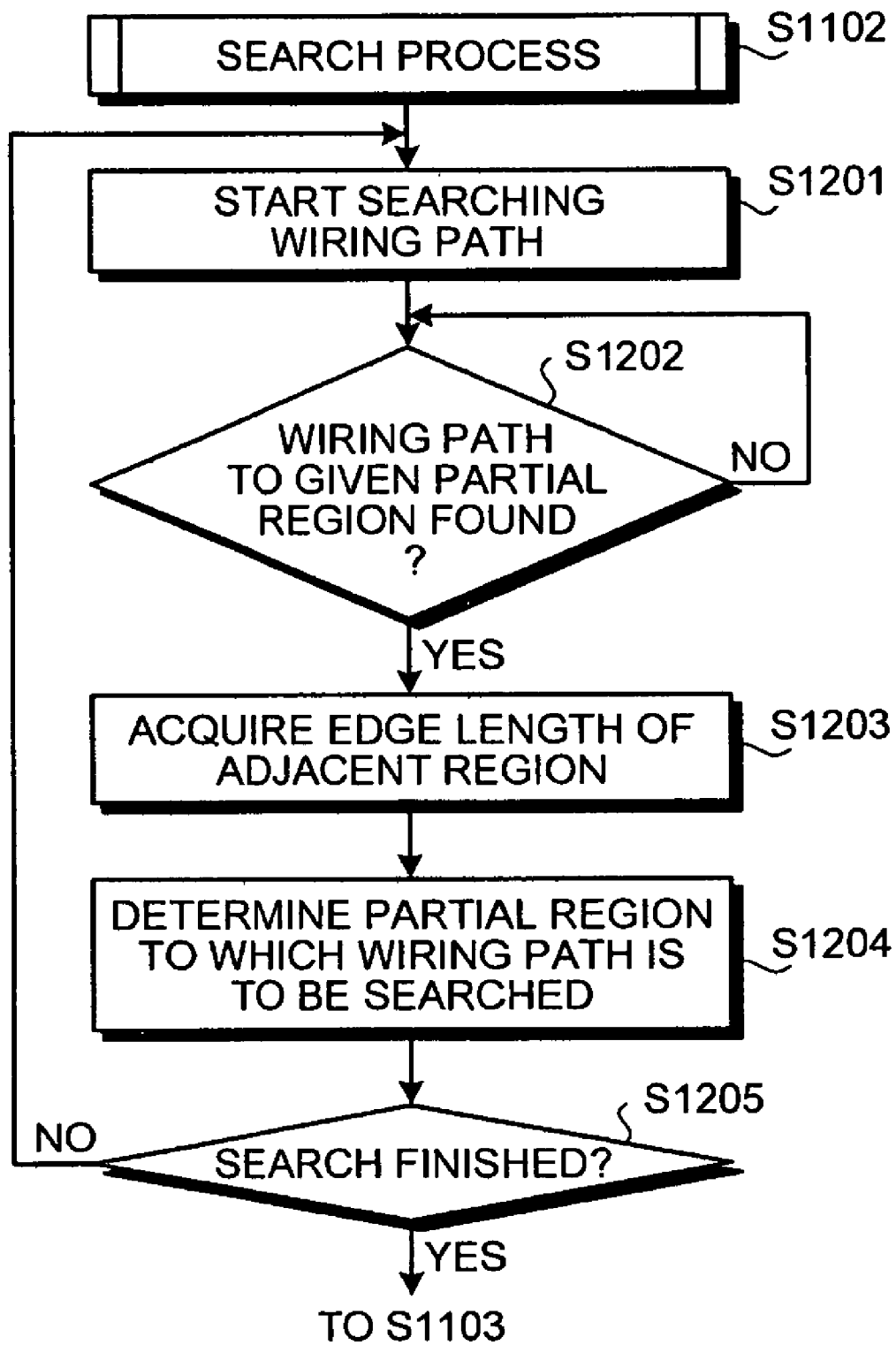
FIG. 12 is a flowchart of an example of a search process.

A process of a search process at step S1102 shown in FIG. 11 is described. FIG. 12 is a flowchart of an example of a search process. As shown in the flowchart of FIG. 12, the search unit 401 starts to search for a wiring path between cells disposed in a layout region of a design target circuit using an arbitrary wiring algorithm (step S1201).

It is judged whether a wiring path to a given partial region has been found (step S1202). Here, waiting occurs while the wiring path to the given partial region is searched for (step S1202: NO), when a wiring path is found (step S1202: YES), the acquiring unit 402 acquires a wire edge length of a partial region adjacent to the given partial region and exclusive of the partial regions through which the wiring path subject to the search already passes (step S1203).

Then, the determining unit 403, based on the acquisition result of the acquiring unit 402, determines a partial region having the smallest wire edge length to be the partial region to which the wiring path is searched for subsequently (step S1204). It is determined whether the wiring path search is finished (step S1205) and, when the search is finished (step S1205: YES), the process proceeds to step S1103 shown in FIG. 11. On the other hand, when the search is not finished (step S1205: NO), the process returns to step S1201.

With this configuration, among arbitrary partial regions during the search, since a partial region having the smallest wiring density is determined as a partial region to which the wiring path is searched for, the maximum wiring density of the partial regions can be constrained.

Figure 13:
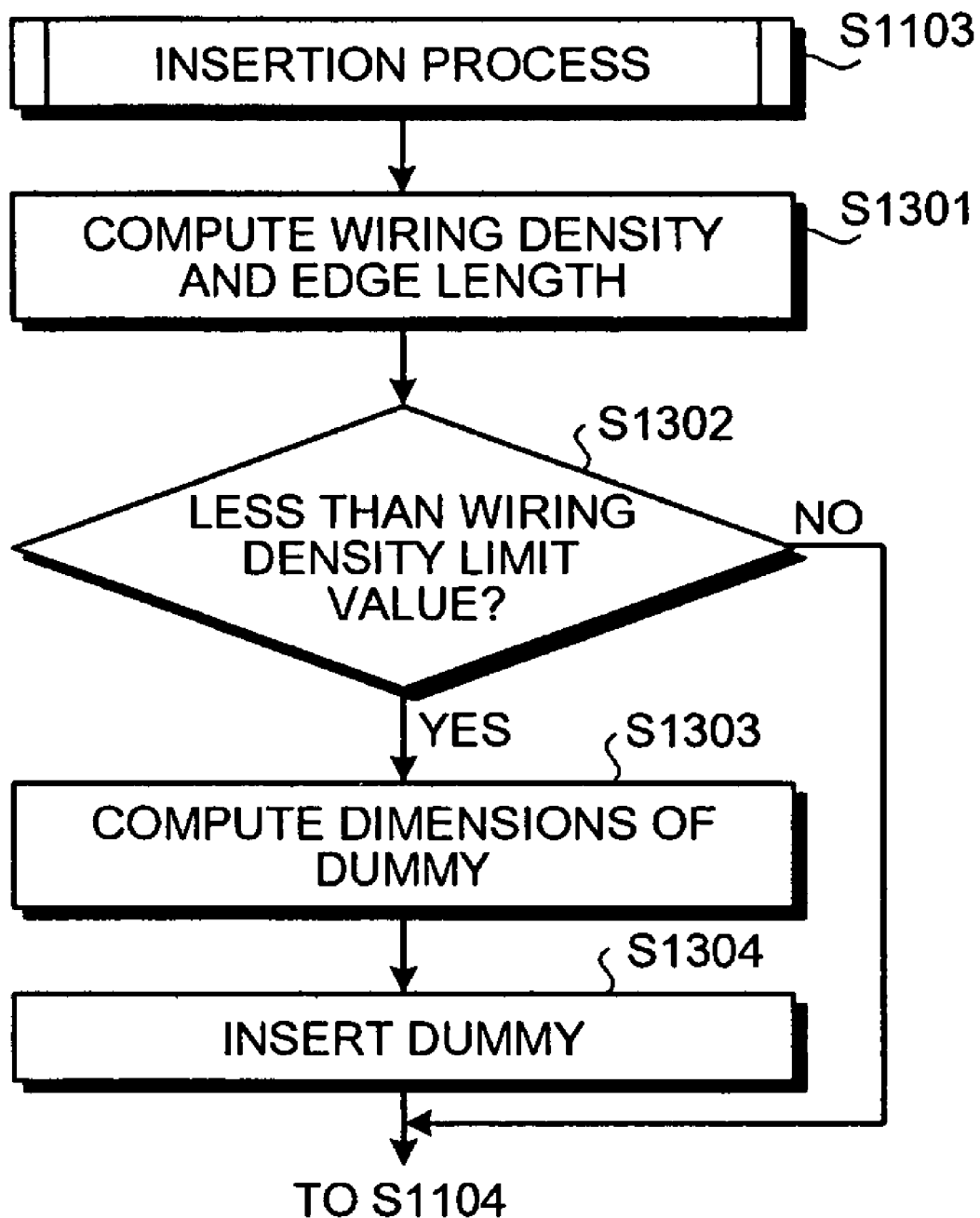
FIG. 13 is a flowchart of an example of an insertion process.

Next, an insertion process at step S1103 shown in FIG. 11 is described. FIG. 13 is a flowchart of an example of an insertion process. As shown in the flowchart in FIG. 13, the calculating unit 405 calculates a wiring density and an edge length for each of the partial regions through which the wiring path found at step S1102 passes (step S1301).

Subsequently, the judging unit 406, based on the wiring density calculated at step S1301, judges whether the wiring density of the partial region is less than a predetermined wiring density limit (step S1302).

Here, when it is judged that the wiring density is less than the wiring density limit (step S1302: YES), the calculating unit 405 calculates dimensions for a dummy based on the wiring density of the insertion target area (step S1303).

Subsequently, the inserting unit 407 inserts a dummy having the dimensions calculated at step S1303 into an unoccupied space in the insertion target area (step S1304), and the process proceeds to step S1104 shown in FIG. 11. At step S1303, the calculating unit 405 can further calculate dimensions for the dummy based on an edge length (of the insertion target area) that does not reach the edge length limit.

With this configuration, since a dummy is inserted into a partial region having a low wiring density after wiring, the minimum wiring density of the partial regions can be constrained. Further, since a dummy having dimensions that take into consideration an edge length in terms of the edge length limit, is inserted, the minimum wire edge length of the partial regions can be constrained.

As described above, according to the present embodiment, since the wiring density and the edge length are uniform, the planarity of the substrate surface after polishing can be improved. With such a structure, semiconductor device yield improves and a high quality semiconductor device can be provided in a short time.

Further, since a library storing dimensions for a dummy that take into consideration the wiring density and edge length of various wirings is not required, the workload for creating the library can be saved and volume data stored to the memory can be reduced.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The layout design apparatus 100 described in the present embodiment can be realized by an application specific integrated circuit (ASIC) such as a standard cell or a structured ASIC or a programmable logic device (PLD) such as a field-programmable gate array (FPGA). Specifically, for example, by defining the functions of the units 401 to 408 of the layout design apparatus 100 by hardware description language (HDL) description and logically synthesizing the HDL description to the ASIC or PLD, the layout design apparatus 100 can be manufactured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium storing therein a layout design program that, with respect to a target circuit to be designed and having a layout region partitioned into plural partial regions, causes a computer to execute:
   searching for a wiring path between cells arranged in the layout region, based on a wire edge length of each of the partial regions, the wire edge length being a sum of lines that are within a respective one of the partial regions and between wiring portions where a wire is arranged and non-wiring portions; and
   outputting a search result of the searching.

2. The non-transitory computer-readable recording medium according to claim 1, wherein the layout design program further causes the computer to execute:
   acquiring, when the wiring path up to a selected one of the partial regions is found as a result of the searching, the wire edge length of a partial region adjacent to the selected partial region and exclusive of the partial regions through which the wiring path, found as a result of the searching, passes; and
   determining, based on an acquisition result of the acquiring, a partial region to which the wiring path is to be extended from the selected partial region.

3. The non-transitory computer-readable recording medium according to claim 2,
   wherein the determining includes determining the partial region having the smallest wire edge length acquired at acquiring as the partial region to which the wiring path is to be searched from the selected partial region.

4. The non-transitory computer-readable recording medium according to claim 2, wherein the acquiring includes acquiring, as a plurality of wiring path candidates, a plurality of wiring paths searched for based on a design rule, and
   the determining includes determining as the wiring path, a wiring path candidate having, over the partial regions through which the wiring path candidate passes, the wire edge length that is smallest among the wiring path candidates.

5. The non-transitory computer-readable recording medium according claim 1,
   wherein the searching includes searching for the wiring path based on a wiring density of each of the partial regions.

6. A non-transitory computer-readable recording medium storing therein a layout design program that, with respect to a target circuit to be designed and having a layout region partitioned into plural partial regions, causes a computer to execute:
   searching for a wiring path between cells arranged in the layout region, based on a wire edge length of each of the partial regions; and
   outputting a search result of the searching, wherein the layout design program further causes the computer to execute:
   calculating a wiring density and the edge length of each of the partial regions through which the wiring path, found as a result of the searching, passes;
   judging, based on the wiring density calculated at the calculating, whether the wiring density of a partial region is less than a wiring density limit; and
   inserting a dummy into an unoccupied space of the partial region that is judged, at the judging, to have the wiring density less than the wiring density limit, and
   the outputting includes outputting an insertion result concerning insertion of the dummy at the inserting.

7. The non-transitory computer-readable recording medium according to claim 6, wherein the judging includes judging whether the edge length of the partial region that is judged to have the wiring density less than the wiring density limit, is smaller than an edge length limit to obtain a judgment result;
   the calculating includes calculating dimensions for the dummy based on the judgment result; and
   the inserting includes inserting the dummy having the dimensions calculated at the calculating based on the judgment result.

8. The non-transitory computer-readable recording medium according to claim 7,
   wherein the calculating includes calculating the dimensions for the dummy based on the edge length of the partial region that is judged to have the wiring density less than the wiring density limit and the edge length smaller than the edge length limit.

9. The non-transitory computer-readable recording medium according to claim 7,
wherein the calculating includes calculating dimensions for the dummy based on the wiring density of the partial region that is judged to have the wiring density less than the wiring density limit.

10. The non-transitory computer-readable recording medium according to claim 6, wherein the layout design program further causes the computer to execute:
receiving a specification of the dimensions for the dummy, and
the judging includes judging whether the wiring density of the partial region is less than the wiring density limit subsequent to the insertion of the dummy, and
the inserting includes inserting a dummy having the dimensions specified at the specifying when at the judging it is judged that the wiring density is less than the limit value to replace the dummy inserted.

11. A layout design apparatus comprising:
a searching unit that, with respect to a target circuit to be designed and having a layout region partitioned into plural partial regions, searches for, based on a wire edge length of each of the partial regions, a wiring path between cells arranged in the layout region, the wire edge length being a sum of lines that are within a respective one of the partial regions and between wiring portions where a wire is arranged and non-wiring portions; and
an output unit that outputs a search result of the searching unit.

12. A layout design method, with respect to a target circuit to be designed and having a layout region partitioned into plural partial regions, comprising:
searching for, based on a wire edge length of each of the partial regions, a wiring path between cells arranged in the layout region, the wire edge length being a sum of lines that are within a respective one of the partial regions and between wiring portions where a wire is arranged and non-wiring portions; and
outputting a search result of the searching on an output unit.

\* \* \* \* \*

UNITED STATES PATENT AND TRADEMARK OFFICE
CERTIFICATE OF CORRECTION

PATENT NO.         : 8,104,008 B2
APPLICATION NO.    : 12/230112
DATED              : January 24, 2012
INVENTOR(S)        : Daisuke Fukuda It is certified that error appears in the above-identified patent and that said Letters Patent is hereby corrected as shown below:

First Page, Column 2 item (56) References Cited (Other Publications), Line 2, Delete "Unifomity" and insert -- Uniformity --, therefor.

Column 14, Line 24, In Claim 5, delete "according" and insert -- according to --, therefor.

Signed and Sealed this
Twenty-ninth Day of May, 2012

David J. Kappos
*Director of the United States Patent and Trademark Office*